United States Patent
Amiard et al.

[11] 3,723,399
[45] Mar. 27, 1973

[54] COPOLYMERS OF OLEFINS OR OLEFINS AND NON-CONJUGATED DIENES WITH NORBORNENE DERIVATIVES

[75] Inventors: Yves Amiard, Pau; Jean-Paul Bellissent, Billere; Gilbert Marie, Pau, all of France

[73] Assignee: Societe Nationale des Petroles D'Aquitaine, Tour Aquitaine Courbevoie, France

[22] Filed: May 11, 1971

[21] Appl. No.: 142,417

[30] Foreign Application Priority Data

May 11, 1970 France..................7017017

[52] U.S. Cl.........260/80.73, 260/41.5 R, 260/80.78, 260/80.81, 260/86.7, 260/88.1 PA
[51] Int. Cl................................C08f 15/40
[58] Field of Search....260/80.73, 80.78, 80.81, 87.3, 260/88.1 PA, 86.7

[56] References Cited

UNITED STATES PATENTS

| | | | |
|---|---|---|---|
| 2,706,721 | 4/1955 | Caldwell | 260/32.6 |
| 3,164,573 | 1/1965 | Schweiker | 260/78.5 |
| 3,294,767 | 12/1966 | Lundberg | 260/80.73 |
| 3,312,675 | 4/1967 | Caldwell | 260/80.81 |
| 3,315,014 | 4/1967 | Coover | 260/895 |
| 3,520,843 | 7/1970 | Moody | 260/29.6 |

Primary Examiner—James A. Seidleck
Assistant Examiner—Roger S. Benjamin
Attorney—Milton J. Wayne

[57] ABSTRACT

Preparation of new copolymers of olefins or olefins and non-conjugated dienes with norbonene derivatives, by co-ordination catalysis.

The norbornene derivatives are selected from those with the formula

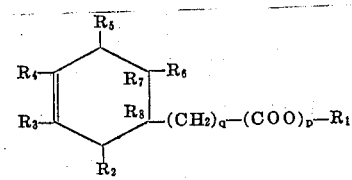

where $q$ is an integer which may equal from 0 to 12, $p$ equals 0 or 1, $R_1$ represents a pyridyl radical, where $p$ equals 0, and an alkyl radical, where $p$ equals 1, and $R_2$ to $R_8$ represent hydrogen or hydrocarbon radicals with from one to 12 carbon atoms. These derivatives are, notably, the adducts of cyclopentadiene and vinylpyridine or alkyl acrylates or methacrylates.

20 Claims, No Drawings

COPOLYMERS OF OLEFINS OR OLEFINS AND NON-CONJUGATED DIENES WITH NORBORNENE DERIVATIVES

The present invention concerns new olefin copolymers, in particular copolymers of alpha-olefins, or of olefins and non-conjugated dienes, with norbornene derivatives.

It also concerns a process to prepare these copolymers, and where they are elastomeric in character, it also concerns their vulcanization, and the vulcanized elastomers obtained.

It is known that olefins, and particularly alpha-olefins, can be polymerized and copolymerized at low pressures, using co-ordination catalytic systems formed by the association of compounds of elements in the sub-groups IV to VIII of the Periodic Table with organo-metallic compounds of the elements in groups I to III of the Table.

These catalystic systems are also known to allow the copolymerization of olefins, particularly alpha-olefins, with non-conjugated dienes, or with halogenated norbornene derivatives.

The applicant has discovered that useful copolymers could be obtained by copolymerizing, by means of these catalytic systems, olefins or olefins and non-conjugated dienes, with norbornene derivatives possessing substitutions containing oxygen or nitrogen atoms.

The copolymers according to the invention are prepared by placing in contact one or more olefins and possibly one or more non-conjugated dienes, with one or more norbornene derivatives with the general formula:

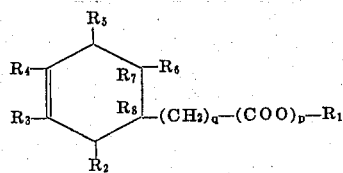

where $q$ is an integer that can equal from 0 to 12, $p$ equals 0 or 1, $R_1$ represents a pyridyl radical

where $p$ equals 0, and a hydrocarbon radical with from one to 16 carbon atoms, preferably alkyl, where $p$ equals 1, and $R_2$ to $R_8$ represent hydrogen or hydrocarbon radicals, preferably alkyls, aryls or cycloalkyls with from one to 12 carbon atoms, in the presence of a co-ordination catalytic system containing an organo-metallic compound (A) of one or more elements in groups I, II or III in the Periodic Table and a compound (B) of a transition metal belonging to one of the groups IV to VIII in the Table.

Olefins that can be polymerized by the process according to the present invention may have between two and 18 carbon atoms. These involve, in particular, alpha-olefins with the formula $R - CH = CH_2$, where R represents hydrogen or a hydrocarbon radical with from one to 16 carbon atoms, in particular alkyl, aryl, alkylaryl. They include linear alpha-olefins such as ethylene, propene, 1-butene, 1-pentene, 1-hexene and 1-octene, the commonest being ethylene, propene and 1-butene.

The non-conjugated dienes that can be copolymerized by the process according to the invention are linear or cyclic. They include in particular 1.4-hexadiene, dicyclopentadiene, tricyclopentadiene, 1.5-cyclo-octadiene, and 5-alkylidene 2-norbornenes, such as 5-methylidene 2-norbornene or 5-ethylidene 2-norbornene.

Among the norbornene derivatives that can be used to prepare copolymers according to the present invention, there are the addition products of cyclopentadiene and alkenylpyridines such as vinylpyridine or allylpyridine, addition products of cyclopentadiene and alkyl acrylates or methacrylates such as methyl, ethyl, propyl, hexyl or octyl acrylate or methacrylate.

The copolymers obtained by the process according to the present invention have a high enough molecular weight to remain solid at ordinary temperatures. They are roughly linear, and may be heat-plastic or elastomeric, depending on the type and proportions of the monomers used in preparing them. Copolymers possessing pyridinic substitutions can be dyed easily with acid coloring agents. Copolymers carrying ester functions can be dyed with basic coloring agents, after hydrolysis of these ester functions. Heat-plastic copolymers are suitable for use in shaping operations in the heat-plastic state, to provide films, sheets, sections, etc. Elastomer copolymers can be vulcanized with free-radical generators such as peroxides, or with sulphur vulcanizing systems when they contain groups derived from a non-conjugated diene.

Copolymers according to the invention contain from 99.9 to 75 percent, and preferably 99.5 to 85 percent weight of non-polar groups derived from one or more olefins and possibly from a non-conjugated diene, and from 0.1 to 25 percent, and preferably 0.5 to 15 percent weight of polar groups derived from norbornene compounds.

When the invention is applied to the preparation of elastomers containing ethylene, the lower limit of the ethylene content is not a determining factor, but the upper limit should preferably be 75 percent weight of the copolymer, to avoid polyethylene-type crystalline structure. The proportion of the second olefin, particular an alpha-olefin such as propene or 1-butene, or of the second olefin and non-conjugated diene, can range from 5 to 75 percent weight of the copolymer; the non-conjugated diene content can range from 0 to 20 percent weight, and the norbonene-derived monomer content from 0.1 to 25 percent, and preferably 0.5 to 15 percent weight.

Catalytic systems that are particularly suitable for the preparation of copolymers in accordance with the invention are formed from the association of organic aluminum compounds with titanium, vanadium, tungsten, zirconium, etc derivatives, for instance halogenides, oxy-halogenides, compounds in which at least one valency of the transition metal is saturated by a hetero-atom, in particular oxygen or nitrogen, linked with an organic grouping, such as acetylacetonates, benzylacetonates, alcoholates.

In certain cases it may be an advantage to use a complex of the transition metal derivative with a ligand selected from aliphatic ethers such as diethylic and dipropylic ethers or diethoxyethane, cyclic ethers such as tetrahydrofuran or dioxane, thioethers, phosphines, arsines, tertiary amines such as trimethylamine, or methyldiethylamine, heterocyclic nitrogen bases such as pyridine or quinoline, β-diacetones, acetoesters, hydroxyaldehydes, aminoaldehydes, aminoalcohols, etc.

Excellent results are obtained whenever the catalytic system contains an organo-aluminic with the formula $AlY_n Cl_{(3-n)}$, where $n$ is a number that can equal 1, 1.5, 2 or 3, and Y is a lower alkyl radical such as ethyl, propyl or isobutyl, associated with a titanium halogenide such as $TiCl_3$ or $TiCl_4$, or a vanadium halogenide or oxyhalogenide such as $VCl_3$, $VCl_4$ or $VOCl_3$, these titanium or vanadium halogenides possibly being made complex by tetrahydrofuran, an aliphatic ether, a tertiary amine, pyridine or quinoline.

The catalyst may possibly be deposited on a backing or linked to this backing chemically. The backing may be either organic or inorganic.

The catalytic system may also include a certain percentage of activator, in particular an alkoxyalkyl halogenosulphate or halogenosulphite, such as ethoxyethyl chlorosulphate or chlorosulphite, a halogenosulphinyl or halogenosulphonylthiophene such as di-2,4-(chlorosulphonyl)-thiophene, or a dichloroarylphosphine such as dichlorophenylphosphine.

In preparing the catalytic system, the compounds (A) and (B) may or may not be mixed before being put into the reactor. For instance, the catalyst may be preformed and possibly "aged," and then fed into the mixture for polymerization, continuously or in batches.

The activator, if present, may be mixed with the catalyst before being added to the reactive mixture, or it may be added directly to the mixture during polymerization, continuously or in fractions; another method is to mix it first with the transition metal or metals compound or compounds.

The catalytic system contains quantities of compounds (A) and (B) such that the ratio between the number of metal atoms of compound A and the number of transition metal atoms of compound B is between one and 50, and preferably between three and 30.

The quantity of activator, if present, can vary widely: from 0.5 to 25 moles of activator per atom of transition metal may be used, but the reactive mixture must contain more of compound A, expressed in metal atoms, than activator.

Copolymerization is done in a suitable solvent, preferably consisting of an aliphatic, aromatic or cycloalkane hydrocarbon, such as heptane, cyclohexane, benzene or mixtures of such solvents. Halogenated hydrocarbons that are inert in relation to the catalyst may also be used, such as chloroform, chlorobenzene, tetrachlorethylene, etc. The olefins themselves can act as a solvent, and copolymerization can be performed, for instance, in the olefin or olefins to be copolymerized, taken in the liquid state.

Copolymerization may be performed at temperatures ranging from −80° to +110° C, but preferably at between −30° and +60° C.

The pressures normally applied during polymerization range from 1 to 10 atmospheres, but it is possible to operate at higher pressures.

The proportion of polar monomer, placed in contact with the olefins, is chosen so that the final copolymer will contain from 0.1 to 25 percent weight of groups derived from the said monomer.

The polar monomer is usually all put into the reactor before addition of the catalytic system. However, all or part of the monomer may be added, continuously or intermittently, during polymerization.

In certain cases it may be an advantage for the polar monomer to be present in the polymerization mixture in the form of a complex with a Lewis acid, for example a trialkyl aluminum, an alkylaluminum dihalogenide, an aluminum halogenide, zinc dichloride or tin tetrachloride. This complex may be prepared in situ in the reactive mixture, or be preformed before being placed in the polymerization zone.

The copolymerization may be performed on a continuous basis, in which case the solvent, monomers and catalytic system are fed continuously into the polymerization zone at rates that will ensure that they remain long enough in the zone to obtain the required concentration of copolymer in the reactive mixture.

During copolymerization, the reactive mixture is deprived of free oxygen by the passage of an inert gas such as nitrogen or argon, before polymerization takes place.

The duration of copolymerization usually varies depending on the operating conditions. It usually lasts between 30 minutes and 3 hours.

At the end of the operation, the catalyst is destroyed by some method known in the previous art, then the copolymer is separated from the solvent by coagulation using an alcohol, by drawing off with the solvent vapor, or by any other method allowing a polymer to be isolated from solutions containing it.

The examples below will illustrate the invention, which, however, is not confined to them.

EXAMPLE 1

Copolymerization is done in a cylindrical glass reactor with an inside diameter of 10 cm and a capacity of 1,000 milliliters, equipped with a stirrer, a funnel through which the polar monomer is fed in, two funnels through which the catalyst components are fed in, and gas-inlet and outlet tubes. The temperature of the reactor is kept at +20° C by means of a thermostatic bath in which it is submerged.

700 milliliters of benzene, from which humidity and gas have previously been extracted, are fed into the reactor, which has a nitrogen atmosphere maintained inside it. The supply of nitrogen is stopped, and a gaseous mixture of ethylene and hydrogen is fed in through the gas-inlet tube, in a molar ratio of ethylene to hydrogen of 3; this mixture circulates at a rate of 100 normal liters an hour throughout the duration of copolymerization.

Ten minutes after the start of injection of the gas mixture, 25 millimoles of the cyclopentadiene/2-vinylpyridine adduct are injected, forming a complex with an equimolecular amount of monoethylaluminum dichloride $AlCl_2(C_2H_5)$, in a solution of 20 milliliters of benzene, then, as catalysts, 5 millimoles of diethylaluminum monochloride $AlCl(C_2H_5)$ and 1 millimole of vanadyl trichloride $VOCl_3$, each diluted in 30 milliliters of benzene.

Thirty minutes after the start of injection of the catalysts, copolymerization is halted by the addition of 20 milliliters of ethanol. The copolymer solution is then poured into ethanol in order to precipitate the copolymer, which is separated by filtration, then washed with ethanol, and dried in a drier at 50° C under reduced pressure.

8 grams of a crystalline copolymer are obtained, containing 97.6 percent weight of ethylene and 2.4 percent of the cyclopentadiene/2-vinylpyridine adduct.

EXAMPLE 2

700 milliliters of anhydrous n-heptane are fed into a similar reactor to the one for Example 1, which is held at a temperature of 20° C, and which contains a nitrogen atmosphere. The supply of nitrogen is then stopped, and a flow of ethylene is injected by the gas-inlet tube, circulating at a rate of 75 normal liters an hour throughout the duration of copolymerization.

Ten minutes after the start of injection of the ethylene, the catalysts are added, 40 millimoles of diethylaluminum chloride and 4 millimoles of vanadyl trichloride, each diluted in 30 milliliters of n-heptane, and then, as monomer, 25 millimoles of the cyclopentadiene/methyl acrylate adduct

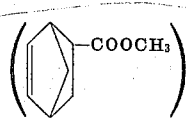

in solution in 20 milliliters of n-heptane. Copolymerization is halted 60 minutes after the start of injection of the catalysts, by adding 20 milliliters of ethanol. The copolymer is next separated from the reactive mixture, and dried, as described in Example 1.

34.6 grams of a crystalline copolymer are obtained, containing 98.8 percent weight of ethylene and 1.2 percent of the cyclopentadiene/methyl acrylate adduct.

EXAMPLE 3

630 milliliters of anhydrous n-heptane and 50 millimoles of the cyclopentadiene/methyl acrylate addition product are fed into a reactor similar to the one in example 1, held at 0° C and containing a nitrogen atmosphere.

The supply of nitrogen is then stopped, and a gaseous mixture of ethylene and propene is injected by the gas-inlet tube, with a molar ratio of propene to ethylene of 2; this mixture circulates at a rate of 100 normal liters an hour.

Thirty minutes after the start of injection of the gaseous mixture, the molar ratio of propene to ethylene is changed to 1, without altering the overall rate of flow, and 4 millimoles of $VOCl_3$, diluted to 60 milliliters with heptane, and 80 millimoles of ethylaluminum sesquichloride, diluted to 160 milliliters with heptane, are fed into the reactor as catalysts drop by drop, over a period of 2 hours.

When addition of the catalysts is completed, polymerization is halted by adding 20 milliliters of ethanol.

The polymer is then separated from the reactive mixture, purified and dried, as described in Example 1.

8 grams of a substance with the appearance of a non-vulcanized elastomer are obtained. This ethylene/propene/cyclopentadiene-methyl acrylate adduct is amorphous in X-rays. It contains 47 percent weight of ethylene and 3 percent of the cyclopentadiene/methyl acrylate adduct.

EXAMPLE 4

Example 3 is reproduced, but replacing the propene with 1-butene, and keeping the molar ratio of butene to ethylene in the olefin mixture at 3 during the saturation phase, and at 2 during the reaction phase, without altering the rate of flow.

8.5 grams of a substance with the appearance of a non-vulcanized elastomer are obtained. This substance is amorphous in X-rays.

The ethylene/butene/cyclopentadiene-methyl acrylate adduct copolymer contains 39 percent weight of ethylene, and 2.8 percent adduct.

EXAMPLE 5

A reactor similar to the one described in Example 1, but with an extra funnel for the introduction of a diene monomer, is used. The reactor is submerged in a thermostatic bath, keeping it at a temperature of 0° C.

30 millimoles of dicyclopentadiene, diluted in 60 milliliters of heptane, are placed in the funnel for the diene, and 50 millimoles of the cyclopentadiene/methyl acrylate adduct, diluted in 60 milliliters of heptane, in the polar monomer funnel. 4 millimoles of $VOCl_3$ in 60 milliliters of heptane are placed in one of the funnels for the catalytic components, and 60 millimoles of ethylaluminum in 60 milliliters of heptane in the other.

630 milliliters of anhydrous heptane are fed into the reactor, which contains a nitrogen atmosphere. The supply of nitrogen is then stopped, and a mixture of ethylene and propene is fed into the reactor by the gas-inlet tube, in a molar ratio of propene to ethylene of 2; this mixture circulates at a rate of 100 normal liters an hour.

Thirty-five minutes after the start of injection of the gaseous mixture, the molar ratio of propene to ethylene is changed to 1, without altering the overall rate of flow, and the dicyclopentadiene, polar monomer and each of the components of the catalytic system are fed respectively drop by drop into the reactor, over a period of 60 minutes.

Polymerization is then halted, and the polymer separated from the reactive mixture, purified and dried, as described in example 1.

8 grams of a substance amorphous in X-rays and with the appearance of a non-vulcanized elastomer are obtained.

This ethylene/propene/dicyclopentadiene/cyclopentadiene-methyl acrylate adduct copolymer contains 45 percent weight of ethylene, 2.8 percent adduct, and 4 non-aromatic double bonds per 1,000 carbon atoms.

Vulcanization 100 parts weight of copolymer are mixed in a roller mixer with 50 parts weight of HAF carbon black, 5 parts zinx oxide, 2 parts sulphur, 1 part mercaptobenzothiazole and 2 parts tetramethylthiurame.

The mixture is heated to 160° C for one hour in a press.

Properties of the vulcanized substance

| . Tensile strength | 130 kg/sq.cm |
| . Breaking elongation | 300 % |
| . Modulus of elasticity at 300 % elongation | 130 kg/sg.cm. |

What is claimed is:

1. A process for preparing copolymers of olefins, or olefins and non-conjugated dienes, with norbonene derivatives, in contact with a catalytic system formed by the association of an organo-metallic compound having at least one element in groups I, II or III of the Periodic Table with a compound of a transition metal in groups IV to VIII of this Table, characterized by the fact that contact is established, in the presence of the said catalyst, between at least one olefin and possibly one or more non-conjugated dienes, and at least one norbornene derivative of of the formula

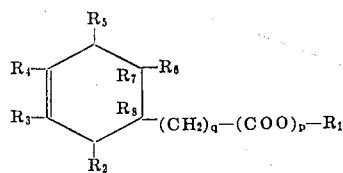

where $q$ is an integer from 0 to 12, $p$ is 0 or 1, $R_1$ represents a pyridyl radical where $p$ is 0, and a monovalent hydrocarbon radical with from one to 16 carbon atoms, where $p$ is 1, and $R_2$ to $R_8$ represent hydrogen or saturated hydrocarbon radicals with one to 12 carbon atoms, the aforesaid copolymers being solid at ordinary temperatures.

2. A process according to claim 1, characterized by the fact that the olefins are alpha-olefins of the formula $R - CH = CH$, where R represents hydrogen or a member of the group consisting of an alkyl, aryl, cycloalkyl and alkylaryl radical containing one to 16 carbon atoms.

3. A process according to claim 2, characterized by the fact that the alpha-olefins are selected from the group consisting of ethylene, propene and 1-butene, or mixtures thereof.

4. A process according to claim 3, characterized by the fact that ethylene/propene or ethylene/1-butene mixtures are used, associated with a non-conjugated diene.

5. A process according to claim 4, characterized by the fact that the non-conjugated diene is selected from dicyclopentadiene, 1.5-cyclo-octadiene, 1.4-hexadiene, and 5-alkylidene 2-norbornenes.

6. A process according to claim 1, characterized by the fact that the norbornene derivative is an adduct of cyclopentadiene with alkenyl-pyridines in which the alkenyl radical is unsaturated in the ω position and contains two to eight carbon atoms.

7. A process according to claim 1, characterized by the fact that the norbonene derivative is an adduct of cyclopentadiene with and alkyl acrylate or methacrylate, wherein the alkyl radical possesses from one to 12 carbon atoms.

8. A process according to claim 1, characterized by the fact that the catalytic system is formed from the association of an organo-aluminum compound and a member selected from the group consisting of a titanium halogenide, vanadium halogenide and oxyhalogenide.

9. A process according to claim 8, characterized by the fact that the transition metal derivative is used in the form of a complex with an organic ligand.

10. A process according to claim 1, characterized by the fact that the polar monomer is present in the polymerization zone in the form of a complex with a Lewis acid.

11. A process according to claim 1, characterized by the fact that copolymerization is conducted at a temperature between $-80°$ and $+110°$ C.

12. A process according to claim 11, characterized by the fact that the copolymerization temperature is between $-30°$ and $+60°$ C.

13. New linear copolymers with high molecular weight which are solid at ordinary temperatures consisting of non-polar groups derived from at least one alpha-olefin of the formula $R - CH = CH_2$, where R represents hydrogen or a hydrocarbon radical with from one to 16 carbon atoms selected from the group consisting of alkyl, aryl and alkyl- aryl and possibly one or more non-conjugated dienes, and polar groups derived from a norbornene compound of the formula

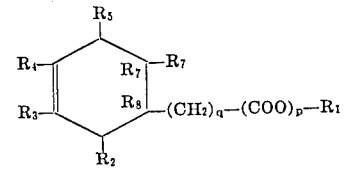

where $q$ is an integer from 0 to 12, $p$ is 0 or 1, $R_1$ represents a pyridyl radical when $p$ is 0, and a saturated monovalent hydrocarbon radical with one to 16 carbon atoms when $p$ is 1, and $R_2$ to $R_8$ represent hydrogen or saturated hydrocarbon radicals with one to 12 carbon atoms, the aforesaid copolymers containing from 99.9 to 75 percent weight of non-polar groups, from 0 to 20 percent of which may be derived from the non-conjugated diene, and from 0.1 to 25 percent weight of polar groups.

14. Copolymers according to claim 13, characterized by the fact that the norbornene compounds from which the polar groups are derived are adducts of cyclopentadiene with alkenylpyridines, the alkenyl radical being unsaturated in the ω position and containing two to eight carbon atoms.

15. Copolymers according to claim 13, characterized by the fact that the norbornene compounds from which the polar groups are derived are adducts of cyclopentadiene with alkyl acrylates or methacrylates, in which the alkyl radical contains one to 12 carbon atoms.

16. Copolymers according to claim 13, characterized by the fact that the non-polar groups are derived from a single olefin, selected from the group consisting of ethylene, propene and 1-butene.

17. Copolymers according to claim 13, characterized by the fact that the non-polar groups are derived from ethylene propylene or 1-butene, the amount of propene or butene in the copolymer ranging from 5 to 75 percent in weight, and the ethylene content of the said copolymer being not more than 75 percent in weight.

18. Copolymers according to claim 13, characterized by the fact that the non-polar groups are derived from ethylene, propene and a non-conjugated diene, the ethylene content of the copolymer being not more than 75 percent in weight, the overall propene and diene content of the said copolymer ranging from 5 to 75 percent in weight, and the diene content ranging from 0.1 to 20 percent in weight.

19. Copolymers according to claim 13, characterized by the fact that the non-conjugated diene is selected from the group consisting of dicyclopentadiene, 1.4-hexadiene, 1.5-cyclo-octadiene, and 5-alkylidene 2-norbornenes in which the alkylidene radicals contain from one to four carbon atoms.

20. A process according to claim 8 wherein the organo-aluminum compound is halogenated.

* * * * *

UNITED STATES PATENT OFFICE
CERTIFICATE OF CORRECTION

Patent No. 3,723,399     Dated March 27, 1973

Inventor(s) Yves Amiard, Jean-Paul Bellissent, and Gilbert Marie

It is certified that error appears in the above-identified patent and that said Letters Patent are hereby corrected as shown below:

In the Abstract and column 1, lines 35-41, column 7 lines 30-35 and column 8 lines 38-43, correct the formula to appear as follows:

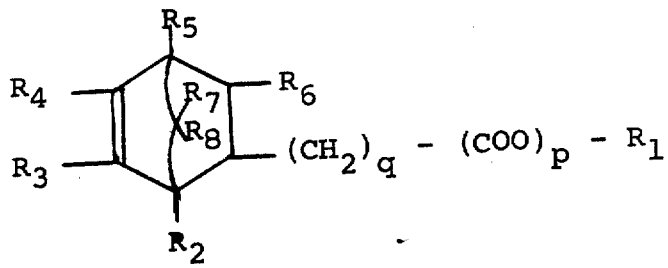

Column 3, line 12: Replace "β-diacetones, acetoesters" by -- β-diketones, ketoesters--.

Column 1, line 19: replace "catalystic" by --catalytic--

Signed and sealed this 22nd day of January 1974.

(SEAL)
Attest:

EDWARD M. FLETCHER, JR.
Attesting Officer

RENE D. TEGTMEYER
Acting Commissioner of Patents

Notice of Adverse Decision in Interference

In Interference No. 98,882 involving Patent No. 3,723,399, Y. Amiard, J. P. Bellissent and G. Marie, COPOLYMERS OF OLEFINS OR OLEFINS AND NON-CONJUGATED DIENES WITH NORBORNENE DERIVATIVES, final judgment adverse to the patentees was rendered Oct. 30, 1975, as to claims 1, 3, 4, 5, 7, 8, 9, 10, 11, 12, 13, 15, 17, 18, 19 and 20.

[*Official Gazette February 10, 1976.*]